(12) United States Patent
Helak et al.

(10) Patent No.: US 9,710,183 B2
(45) Date of Patent: Jul. 18, 2017

(54) EFFECTIVELY LIMITLESS APPARENT FREE SPACE ON STORAGE DEVICE

(71) Applicant: International Business Machines Corporation, Armonk, NY (US)

(72) Inventors: Dustin A. Helak, Tucson, AZ (US); Marc A. Martin, Tucson, AZ (US); Jason Webster, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/839,431

(22) Filed: Aug. 28, 2015

(65) Prior Publication Data
US 2015/0370503 A1 Dec. 24, 2015

Related U.S. Application Data

(63) Continuation of application No. 13/163,683, filed on Jun. 18, 2011, now Pat. No. 9,146,679.

(51) Int. Cl.
*G06F 3/06* (2006.01)
*G06F 12/02* (2006.01)

(52) U.S. Cl.
CPC .......... *G06F 3/0631* (2013.01); *G06F 3/0605* (2013.01); *G06F 3/0607* (2013.01); *G06F 3/068* (2013.01); *G06F 3/0644* (2013.01); *G06F 3/0647* (2013.01); *G06F 3/0683* (2013.01); *G06F 12/023* (2013.01)

(58) Field of Classification Search
CPC .... G06F 3/0608; G06F 3/0646; G06F 3/0647; G06F 3/0649
See application file for complete search history.

(56) References Cited

U.S. PATENT DOCUMENTS 5,564,037 A * 10/1996 Lam .................. G06F 3/0608
707/999.202
6,850,959 B1 * 2/2005 Golds ................ G06F 3/0607
707/822

(Continued)

OTHER PUBLICATIONS

Non-final office action for U.S. Appl. No. 13/163,683 dated Jun. 23, 2014, 17 pp.

(Continued)

*Primary Examiner* — Edward Dudek, Jr.
*Assistant Examiner* — Andrew Russell
(74) *Attorney, Agent, or Firm* — Feb Cabrasawan

(57) ABSTRACT

A primary physical storage device has effectively limitless apparent free space. Responsive to receiving a request to dynamically allocate an amount of desired free space on the primary device to store new data on the primary device, and responsive to determining that an amount of actual free space on the primary device is insufficient to permit such allocation, existing data stored on the primary device is moved to a secondary storage device. The first existing data appears to still be stored on the primary device. Responsive to receiving a request to retrieve existing data from the primary device, and to determining that the existing data has been moved to the secondary device, the existing data is moved back to the primary device. The existing data was originally stored on the primary device, and is currently stored on the primary device or has been moved to the secondary device.

16 Claims, 5 Drawing Sheets

(56) References Cited

U.S. PATENT DOCUMENTS

| | | |
|---|---|---|
| 7,526,623 B1 | 4/2009 | Rao |
| 7,796,975 B2 | 9/2010 | Goss |
| 2003/0037019 A1 | 2/2003 | Nakamura |
| 2003/0110190 A1* | 6/2003 | Achiwa ............... G06F 3/0608 |
| 2004/0044853 A1 | 3/2004 | Gibble et al. |
| 2005/0125604 A1* | 6/2005 | Williams ............... G06F 3/061 |
| | | 711/112 |
| 2009/0276588 A1 | 11/2009 | Murase |
| 2009/0319721 A1 | 12/2009 | Lin |
| 2010/0250882 A1 | 9/2010 | Hutchison et al. |
| 2012/0324201 A1 | 12/2012 | Martin et al. |

OTHER PUBLICATIONS

Final office action for U.S. Appl. No. 13/163,683 dated Dec. 12, 2014, 20 pp.

Notice of allowance for U.S. Appl. No. 13/163,683 dated May 20, 2015, 8 pp.

\* cited by examiner

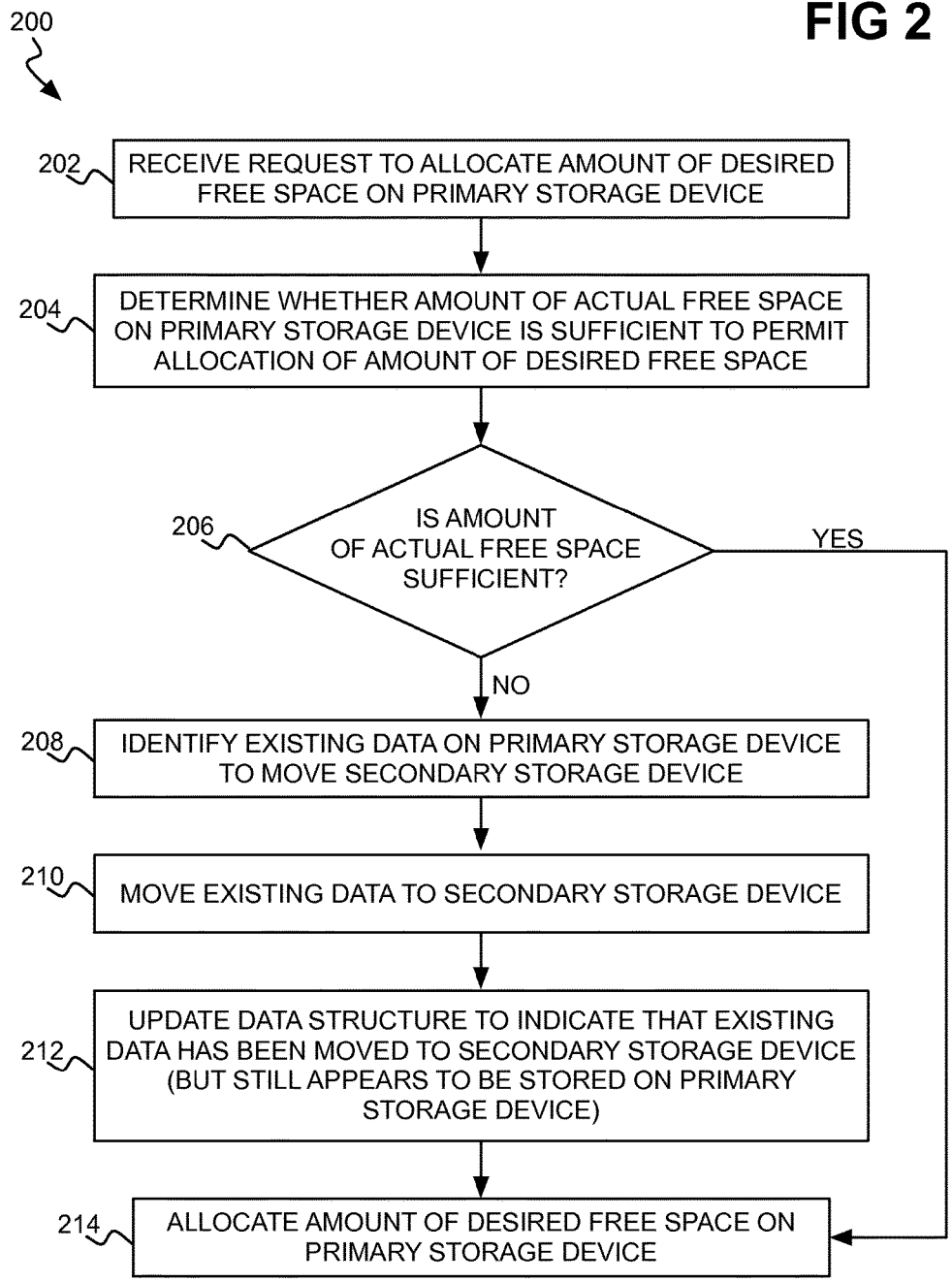

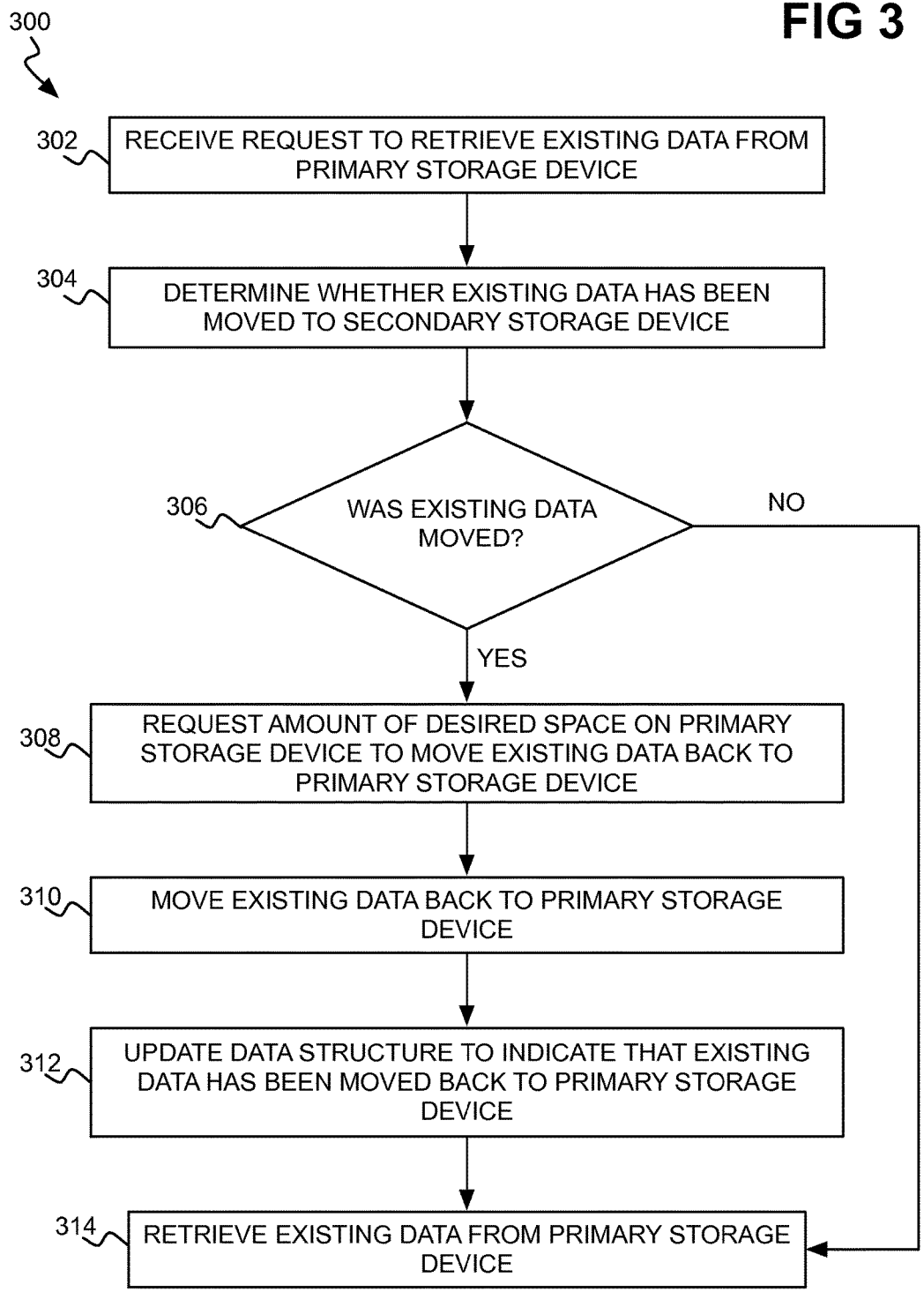

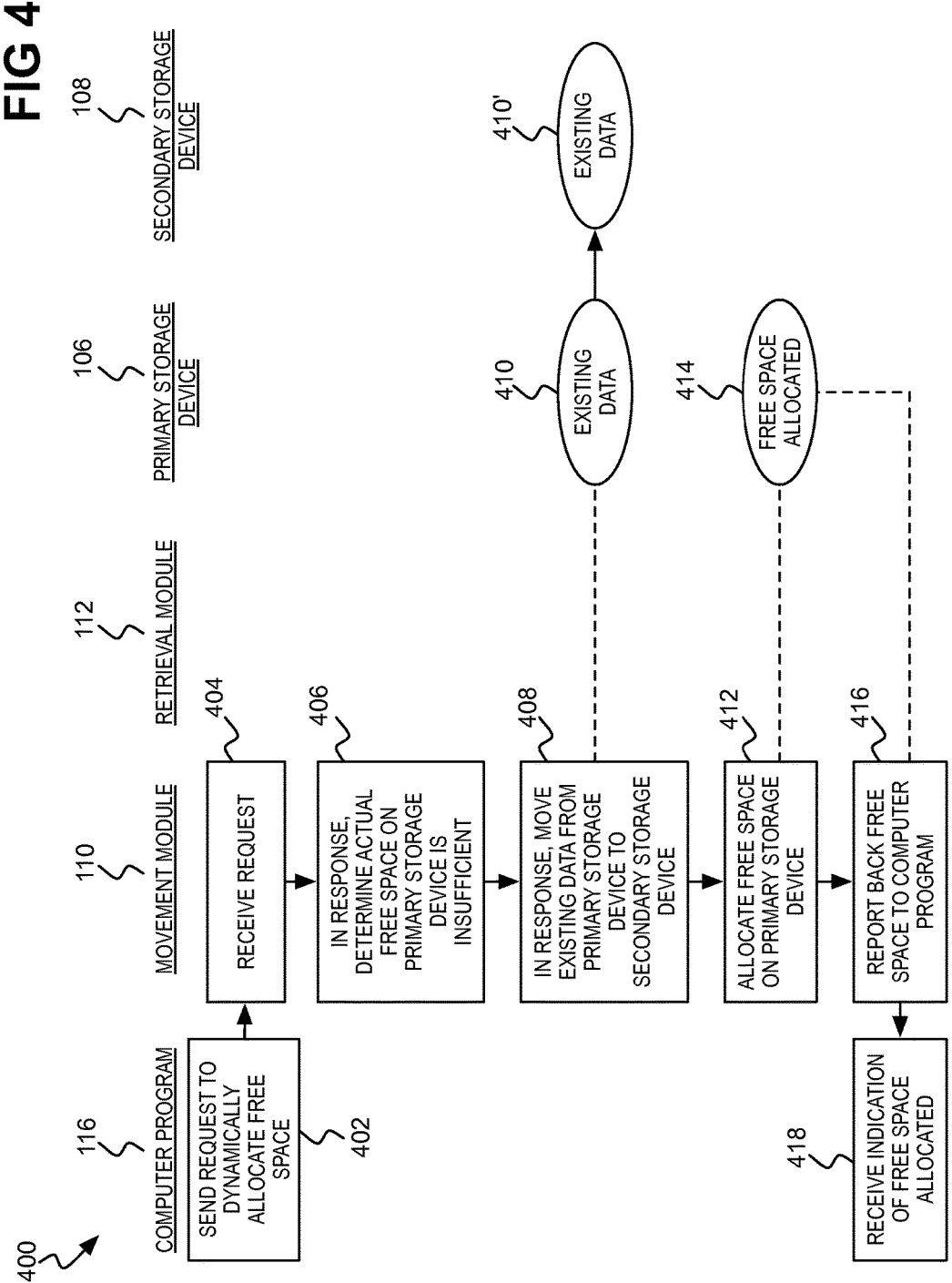

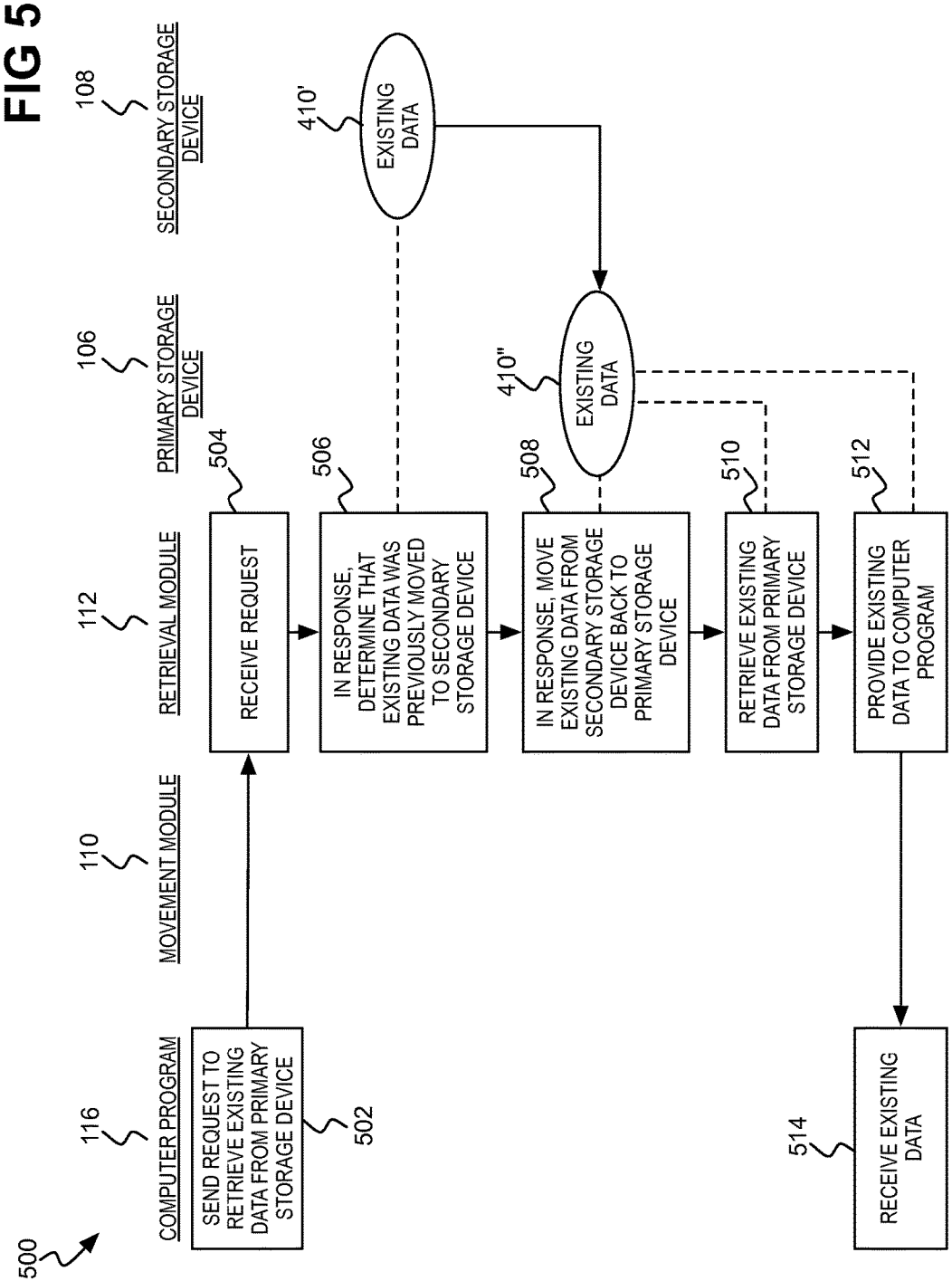

US 9,710,183 B2

EFFECTIVELY LIMITLESS APPARENT FREE SPACE ON STORAGE DEVICE

BACKGROUND

In modern computing systems, data is typically generated, retrieved, and/or updated. For example, word processing computer programs are used to generate, retrieve, and/or update text documents and other types of data, spreadsheet computer programs are used to generate, retrieve, and/or update spreadsheets and other types of data, whereas database programs are used to generate, retrieve, and/or update databases and other types of data. These and other types of data are typically stored on a storage device. An example of such a storage device is a hard disk drive, or a number of such hard disk drives organized in some type of configuration to appear as a single storage device, or logical volume.

SUMMARY

A method of an embodiment of the invention is performed by a processor for managing a primary storage device so that an amount of apparent free space on the primary storage device is effectively limitless. The method includes receiving a request to dynamically allocate an amount of desired free space on a primary storage device to store new data on the primary storage device. The primary storage device is a physical storage device. The method includes, in response to receive the request, and in response to determining that an amount of actual free space on the primary storage device is insufficient to permit such allocation, moving existing data stored on the primary storage device to a secondary storage device to increase the amount of actual free space on the primary storage device. However, the existing data appears to still be stored on the primary storage device. The method includes allocating the amount of desired free space on the primary storage device. The existing data is moved from the primary storage device to the secondary storage device responsive to receipt of the request to dynamically allocate the amount of desired free space on the primary storage device.

A computer-readable data storage medium of an embodiment of the invention stores computer-readable code that is executable by a computing device to perform a method for managing a primary storage device so that an amount of apparent free space of the primary storage device is effectively limitless. The method includes receiving a request to retrieve existing data from a primary storage device that was originally stored on a primary storage device and that is currently stored on the primary storage device or that has been moved from the primary storage device to a secondary storage device responsive to a request to dynamically allocated an amount of desired free space on the primary storage device. The primary storage device is a physical storage device. Where the existing data has been moved to the secondary storage device, the existing data appears to still be stored on the primary storage device. The method includes, in response to determining that the existing data has been moved to the secondary storage device, moving the existing data from the secondary storage device back to the primary storage device. The method includes retrieving the existing data from the primary storage device. The existing data has been moved from the primary storage device to the secondary storage device responsive to receipt of the request to dynamically allocate the amount of desired free space on the primary storage device.

A system of an embodiment of the invention includes a processor, a primary storage device having an amount of apparent free space that is effectively limitless, a secondary storage device, a movement module executable by the processor, and a retrieval module also executable by the processor. The primary storage device is a physical storage device. The movement module is to move first existing data stored on the primary storage device to the secondary storage device to increase an amount of actual free space on the primary storage device, such that the first existing data appears to still be stored on the primary storage device. This movement is responsive to two conditions. The first condition is receiving a first request to dynamically allocate an amount of desired free space on the primary storage device to store new data on the primary storage device. This second condition is determining that the amount of actual free space on the primary storage device is insufficient to permit allocation of the amount of desired free space on the primary storage device. The existing data is moved from the primary storage device to the secondary storage device responsive to receipt of the request to dynamically allocate the amount of desired free space on the primary storage device.

The retrieval module is to move second existing data from the secondary storage device back to the primary storage device. This movement is responsive to two conditions. The first condition is receiving a second request to retrieve the second existing data from the primary storage device. The second existing data was originally stored on the primary storage device and is currently stored on the primary storage device or has been moved from the primary storage device to the secondary storage device. Where the second existing data has been moved to the secondary storage device the second existing data appears to still be stored on the primary storage device. The second condition is determining that the second existing data has been moved to the secondary storage device.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2 is a flowchart of a method for handling a request to allocate desired free space on a storage device in a way that permits the storage device to have effectively limitless apparent free space, according to an embodiment of the invention.

FIG. 3 is a flowchart of a method for handling a request to retrieve existing data originally stored on a storage device that has effectively limitless apparent free space, according to an embodiment of the invention.

FIG. 4 is a diagram illustrating example performance of the method of FIG. 2 in relation to the system of FIG. 1, according to an embodiment of the invention.

FIG. 5 is a diagram illustrating example performance of the method of FIG. 3 in relation to the system of FIG. 1, according to an embodiment of the invention.

DETAILED DESCRIPTION

Figure 1:
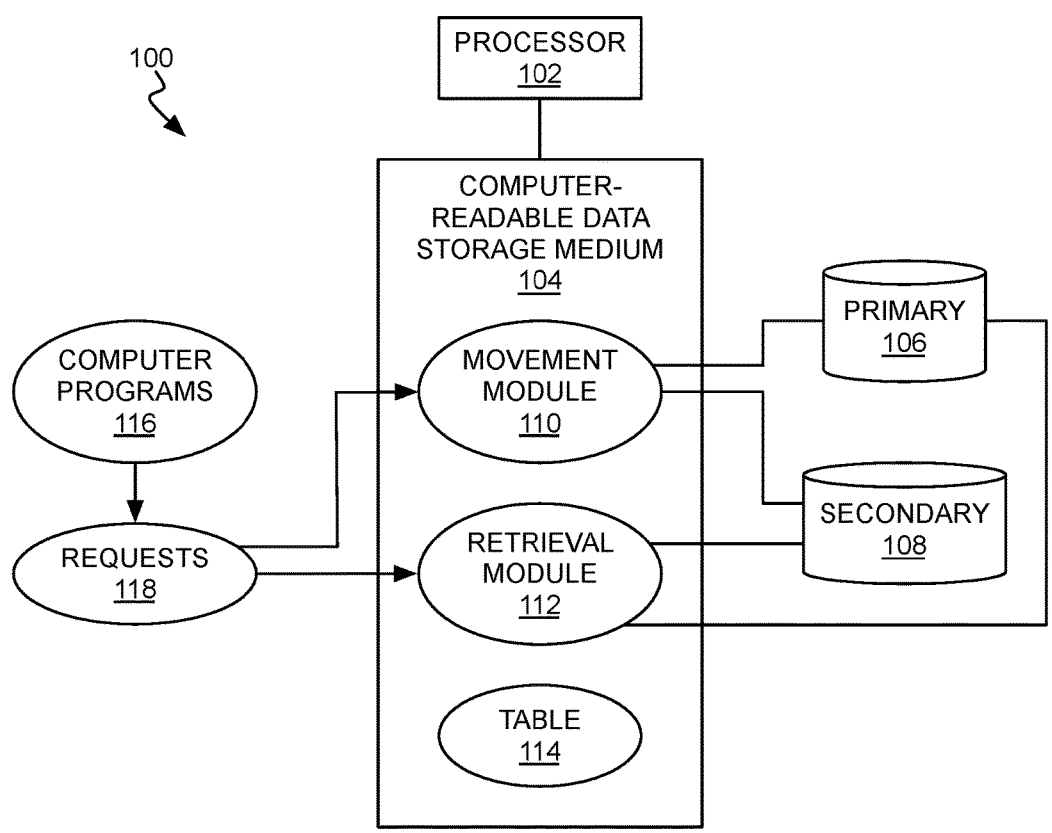
FIG. 1 is a diagram of a system to provide for a storage device having effectively limitless apparent free space, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, data generated, retrieved, and/or updating within computing systems is stored on a storage device, such as a hard disk drive. While hard disk drives have increased in capacity over time, they still have finite capacities. Furthermore, other types of storage devices, such as solid state drives that are faster than hard disk drives and which are experiencing increased usage for at least this reason, have finite capacities that are usually much smaller than those of hard disk drives.

As such, it can be a very real problem that a user is attempting to store new data on a storage device, but that the storage device has insufficient free space remaining. In this instance, the user typically has to stop what he or she is doing, and either delete some existing data from the storage device to free up additional space for the new data, or move some existing data to a different storage device. This process can be laborious and time-consuming, however, particularly if the existing data selected for deletion or movement is needed later.

Disclosed herein, by comparison, are techniques that provide for effectively limitless apparent free space on a storage device that nevertheless has finite capacity. This storage device is referred to herein as a primary storage device, solely to distinguish the storage device from other storage devices also referenced herein, such as a secondary storage device. Existing data on the primary storage device is moved to the secondary storage device (or devices) as needed to free up space on the primary storage device. When this existing data is requested from the primary storage device, it is moved back to the primary storage device, which may include moving other existing data to the secondary storage device first to make room. These processes are transparent to computer programs and users making the requests, providing for what is effectively limitless apparent free space on the primary storage device.

The techniques disclosed herein differ from and are advantageous to other existing storage management techniques. One existing technique is known as thin provisioning. In thin provisioning, a logical storage volume has a size that can increase based on the amount of data that is being written to the volume. Therefore, a number of such logical storage volumes can be implemented on the same primary (physical) storage device such that each volume is provided with an amount of space on the storage device commensurate with the data that it is storing.

For example, consider a one-gigabyte physical storage device on which four logical storage volumes are to be implemented. Without thin provisioning, each logical storage volume may be sized for 250 megabytes, such that each storage volume is allocated 250 megabytes on the physical storage device. However, one volume may ultimately need to store 500 megabytes. The size of this volume cannot be increased, because the other volumes are using (i.e., have been allocated) the rest of the space on the physical storage device; there is no empty space on the physical storage device to allocate to this volume. This is true even if the other three volumes are storing no data, because they have each been allocated 250 megabytes of the physical storage device.

Therefore, in thin provisioning, the four logical storage volumes in this example are initially implemented without specifying the amount of space to be allocated on the physical storage device. As data is written to the logical storage volumes, the volumes are increased in size and allocated available space on the physical storage device. Therefore, if three of the volumes are not storing any data, the fourth logical storage volume can store 750 megabytes of data, as in the example, because 750 megabytes can be allocated to this storage volume from the physical storage device as the storage volume requires it.

Thin provisioning is therefore a technique that is complementary to the techniques disclosed herein. Thin provisioning, in other words, still suffers from the disadvantages that the techniques disclosed herein solve. Once the physical storage device has had its storage space allocated to logical storage volumes, the logical storage volumes are unable to allocate any further storage space. By comparison, the techniques disclosed herein provide for effectively limitless apparent free space on a physical storage device. Therefore, thin provisioning can be used in conjunction with the techniques disclosed herein, to provide for allocation of logical storage volumes, per thin provisioning, and to provide for effectively limitless apparent free space on the physical storage device on which these logical volumes are implemented, per the techniques disclosed herein.

Another existing technique that is somewhat similar to thin provisioning is a sparse image. With a sparse image, the size of a logical storage volume is reported as a pre-specified size. However, the actual space occupied by the logical storage volume on the primary (physical) storage device on which the volume is implemented is equal to the amount of data stored in the volume. For example, a logical storage volume can report a size of fifty gigabytes, but if the volume is currently only storing five gigabytes of data, then just five gigabytes of the actual storage space of the physical storage device is used.

As such, sparse images also suffer from the same disadvantages that thin provisioning does. For example, a user may create four sparse images of 500 megabytes each on a one-gigabyte primary (physical) storage device. The theoretical total size of the sparse images is thus greater than the actual maximum physical space afforded by the storage device. Once the total amount of data stored in the sparse images is greater than one gigabyte, however, no further data is able to be stored. As such, even though the sparse images may report that there is available storage space, in actuality there is not.

The techniques disclosed herein are thus complementary to the utilization of sparse images as well. A number of sparse images can be implemented on a primary (physical) storage device. When the total amount of data stored within the sparse images begins to approach the maximum available physical space of the storage device, the techniques disclosed herein are employed to ensure that each sparse image can store an amount of data equal to its pre-specified size.

A third existing technique is called hierarchical storage management. Similar to the techniques disclosed herein, and unlike thin provisioning and sparse images, hierarchical storage management permits data stored on a primary (physical) storage device to be offloaded to another, different storage device. However, the techniques disclosed herein perform such offloading responsive to allocation requests relating to the primary storage device where there is insufficient space (within a threshold) on the primary storage device to satisfy these requests. By comparison, hierarchical storage management is performed in accordance with a schedule.

For example, each day at a predetermined time, data that has not been accessed recently (in accordance with some type of policy or rule) is moved from the primary storage device to a different storage device using hierarchical storage management. When the data that has been moved to the different storage device needs to be used, it is moved back to the primary storage device. However, if between scheduled data movements allocation requests require more space than is available on the primary storage device, these requests fail. Hierarchical storage management, in other words, does not move data taking into consideration both allocation requests and the current available space on the primary storage device, and also is not performed dynamically responsive to such allocation requests.

As such, hierarchical storage management is also a technique that is complementary to the techniques disclosed herein. Hierarchical storage management can be employed periodically, such as daily, to move stale (i.e., less accessed) data from a primary storage device to a different storage device. Between these iterations, the techniques disclosed herein can be performed to ensure that any received allocation request is always able to be satisfied (assuming sufficient space on one or more secondary storage devices to which to move data from the primary storage device). By comparison, hierarchical storage management cannot provide this guarantee.

Consider the following example. A one-terabyte primary storage device is managed using hierarchical storage management techniques to ensure that every morning, there is at least 100 gigabytes of available storage space on this device. Therefore, hierarchical storage management may move the oldest files from the primary storage device to ensure that this amount of space is available. Such a policy may have been put in place because historically, for instance, no more than ten gigabytes of space has been allocated from the primary storage device on a given day, such that ensuring that at least 100 gigabytes is available is thought to provide an adequate margin of safety.

However, on one unordinary day, 200 gigabytes of storage space may be attempted to be allocated from the primary storage device. Using only hierarchical storage management techniques, after the first 100 gigabytes have been allocated, the remaining allocation requests fail. By comparison, if the techniques disclosed herein are used in conjunction with (or in lieu of) hierarchical storage management, these remaining allocation requests will not fail. This is because the data is moved from the primary storage device responsive to the receipt of such allocation requests, which is not how hierarchical storage management works.

FIG. 1 shows a system 100, according to an embodiment of the invention. The system 100 can include a processor 102, a computer-readable data storage medium 104, a primary storage device 106, and a secondary storage device 108. The system 100 can be implemented as one computing device, such as a computer, or as more than one computing device that may be interconnected with one another, such as over a network.

The computer-readable data storage medium 104 may be a semiconductor or another type of volatile memory, or another type of computer-readable data storage medium 104. Each of the storage devices 106 and 108 is to store data in a non-volatile memory. Examples of such storage devices 106 and 1008 include hard disk drives and solid state drives. Each of the storage devices 106 and 108 may be implemented as such a single physical storage device, or as a configuration of more than one such physical storage device that appear as a single storage device, or volume.

The computer-readable data storage medium 104 can store a movement module 110, a retrieval module 112, and a table 114. The modules 110 and 112 may be or include computer-readable code that is executable by the processor 102. The modules 110 and 112 perform various functionality, and in so doing may reference, update, or store information within the table 114. The table 114 is more generally a data structure.

One or more computer programs 116 may be running on the system 100, or may be accessing the system 100. The computer programs 116 generate one or more requests 118, and thus may be referred to as request originators. Some requests 118 are to allocate desired free space on the primary storage device 106 to store new data on the storage device 106. Other requests 118 are to retrieve existing data from the primary storage device 106.

These requests 118 are intercepted or otherwise received by the movement module 110 and/or the retrieval module 112. In general, requests 118 pertaining to allocating desired free space on the primary storage device 106 to store new data on the storage device 106 are intercepted or otherwise received by the movement module 110. By comparison, requests 118 pertaining to retrieving existing data from the primary storage device 106 are intercepted or otherwise received by the retrieval module 112.

The movement module 110 in general operation receives a request to allocate desired free space on the primary storage device 106 to store new data. In response, the movement module 110 determines whether the amount of actual free space on the storage device 106 is sufficient to permit allocation of the amount of desired free space on the storage device 106. If the amount of free space on the primary storage device 106 is sufficient, then the amount of desired free space is allocated on the storage device 106.

If the amount of free space on the primary storage device 106 is insufficient to permit allocation of the amount of desired free space on the storage device 106, however, then the movement module 110 moves existing data stored on the storage device 106 to the secondary storage device 108 to increase the amount of free space on the primary storage device 106. The movement module 110 may indicate in the table 114 that this existing data is now actually stored on the secondary storage device 108. However, from the perspective of the computer programs 116—and indeed, in one embodiment, from the perspective of all or substantially all other components of the system 100 except for the modules 110 and 112—the existing data appears to still be stored on the primary storage device 106. The desired amount of free space can then be allocated on the primary storage device 106.

The retrieval module 112 in general operation receives a request to retrieve existing data from the primary storage device 106. The existing data was originally stored on the primary storage device 106, but may have been moved to the secondary storage device 108, although the existing data appears to still be stored on the primary storage device, from the perspective of at least the computer programs 106. In response to receiving the request, the retrieval module 112 determines whether the existing data is currently stored on primary storage device 106, such as by looking up the existing data within the table 114. If the existing data is still stored on the primary storage device 106, then the existing data is retrieved.

However, if the existing data that has been requested has been moved from the primary storage device 106 to the secondary storage device 108 by the movement module 110, the retrieval module 112 moves this existing data back to the primary storage device 106. If there is insufficient free space on the primary storage device 106 to move this existing data back to the storage device 106, the retrieval module 112 may first request that the movement module 110 move other existing data from the storage device 106 to the secondary storage device 108 to free up space. The existing data that has been requested is then retrieved from the primary storage device 106.

In these ways, then, the free space on the primary storage device 106 is apparently effectively limitless. The computer programs 116 and components of the system 100 other than the modules 110 and 112 are unaware that some existing data that appears to be stored on the primary storage device 106 has in fact been moved to the secondary storage device 108. As the secondary storage device 108 itself runs out of space, additional secondary storage devices can be added to the system 100 as desired. The additional storage devices may, like the storage device 108, be secondary to the primary storage device 106, or each additional storage device may itself be secondary to another secondary storage device such as the secondary storage device 108.

It is noted that the movement module 110 and the retrieval module 112 operate transparently to the originators of the requests 118—i.e., to the computer programs 116, and so on. The modules 110 and 112 perform their functionality automatically, such that the movement of existing data back and forth between the storage devices 106 and 108 does not have to be manually initiated, controlled, or managed by any such request originator. The originators of the requests 118 may indeed be unaware that existing data is being moved back and forth between the storage devices 106 and 108, or even that the modules 110 and 112 are intercepting the requests 118. The originators may in fact be unaware that there is even a secondary storage device 108.

As such, the originators of the requests 118 can treat the primary storage device 106 as having essentially infinite capacity, such that the free space of the storage device 108 is effectively apparently limitless. Assuming that there is sufficient actual capacity at the secondary storage device 108 (and at any other such secondary storage devices), the originators never experience any "out of space" errors when attempting to allocate free space on the primary storage device 106 to store new data. The originators may thus never be required to manually initiate the removal or deletion of existing data stored on the primary storage device 106 to free up space on the storage device 106.

FIG. 2 shows a method 200, according to an embodiment of the invention. The method 200 can be performed by the movement module 110. As such, the method 200 can be implemented as computer-readable code. The computer-readable code may be stored on the computer-readable data storage medium 104 and executed by the processor 102 to perform the method 200. The method 200 is described in relation to the system 100, but is more generally applicable to other types of systems as well.

The movement module 110 receives a request to allocate an amount of desired free space on the primary storage device 106 to store new data on the storage device 106 (202). The movement module 110 determines whether the amount of actual free space on the primary storage device 106 is sufficient to permit the amount of desired free space to be allocated (204). In one embodiment, the amount of actual free space is determined to be sufficient to permit the amount of desired free space to be allocated only if there is in actuality a greater amount of actual free space than the amount of desired free space, to some degree.

For example, the request in question may indicate that a block of free space is needed on the primary storage device 106 to store new data. There may be four blocks of actual free space on the primary storage device 106. However, allocation requests may come into bunches. Therefore, the movement module 110 may determine that there is nevertheless insufficient space on the primary storage device 106, because there is not at least twenty blocks of actual free space (or some other amount greater than the single block requested). The purpose here is to ensure that there is more actual free space on the primary storage device 106 than what has been requested, so that at least some subsequent free space requests do not require movement of existing data from the primary storage device 106 to the secondary storage device 108.

If there is not a sufficient amount of actual free space on the primary storage device 106, as determined in part 204 (206), then the movement module 110 identifies existing data on the primary storage device 106 to move to the secondary storage device 108 (208). The amount of existing data that is identified takes up space on the primary storage device 106 that is equal to or greater than the amount of desired space that has been requested. In one embodiment, such existing data is identified as the existing data stored on the primary storage device 106 that has been least recently accessed—i.e., the "oldest" such existing data on the storage device 106. The most recent time of access for the existing data on the primary storage device 106 may be stored within the table 114, or it may be stored on the storage device 106 itself, etc.

The movement module 110 moves this identified existing data from the primary storage device 106 to the secondary storage device 108 (210). As such, the existing data is no longer stored on the primary storage device 106. However, as has been noted above, the existing data still appears to be stored on the primary storage device 106. The movement module 110 may update the table 114 (or other data structure) to indicate that the existing data has been moved to the secondary storage device 108 (212), even though the existing data still appears to be stored on the primary storage device 106.

From part 214, or if the amount of actual free space on the primary storage device 106 was earlier deemed sufficient in part 204 (206), the method 200 proceeds to allocate the amount of desired free space on the primary storage device 106 that has been requested (214). Therefore, the originator of the request can then store new data within this allocated free space. The movement of existing data from the primary storage device 106 to the secondary storage device 108, if it occurred, is transparent to the originator, however, such that the originator is unaware of such existing data movement. The request originator does not have to manually initiate, control, or manage this movement process; rather, the process is performed automatically by the movement module 110.

FIG. 3 shows a method 300, according to an embodiment of the invention. The method 300 can be performed by the retrieval module 112. As such, the method 300 can be implemented as computer-readable code. The computer-readable code may be stored on the computer-readable data storage medium 104 and executed by the processor 102 to perform the method 300. The method 300 is described in relation to the system 100, but is more generally applicable to other types of systems as well.

The retrieval module 112 receives a request to retrieve existing data from the primary storage device 106 (302). The existing data was originally stored on the primary storage device 106. The existing data may still be currently stored on the primary storage device 106, or it may have been moved from the storage device 106 to the secondary storage device 108, such as by the movement module 100. However, from the perspective of the request originator, the existing data still appears to be stored on the primary storage device 106 regardless of whether the existing data has been moved to the secondary storage device 106.

The retrieval module 112 determines whether the existing data has in fact been moved to the secondary storage device 108 from the primary storage device 106 (304). In one embodiment, the retrieval module 112 may look up the existing data within the table 114 (or other data structure) to determine whether the existing data, while appearing to still be stored on the primary storage device 106, has in fact been moved to the secondary storage device 108. As noted above, such movement is transparent to the request originator.

If the existing data has been moved to the secondary storage device 108 (306), then the retrieval module 112 requests an amount of desired space on the primary storage device 106 sufficient to move the existing data back to the storage device 106 (308). For instance, the retrieval module 112 may send such a request to the movement module 110, which correspondingly performs the method 200. Once there is a sufficient actual amount of free space on the primary storage device 106, the retrieval module 112 proceeds to move back the existing data from the secondary storage device 108 back to the primary storage device 106 (310), such that this existing data is no longer stored on the secondary storage device 108.

The retrieval module 112 may update the table 114 (or other data structure) to indicate that the existing data has been moved back to the primary storage device 106 (312). As such, before the existing data appeared to still be stored on the primary storage device 106 but in fact was moved to the secondary storage device 108. However, now the existing data has been moved back to the storage device 106. The table 114 is thus updated to reflect this information.

From part 312, or if the existing data was determined in part 306 to still be stored on the primary storage device 106 such that it has not been moved to the secondary storage device 108 (306), the method 300 proceeds to retrieve the existing data that has been requested, from the primary storage device 106 (314). Therefore, the originator of the request receives the existing data from the primary storage device 106. The movement of the existing data from the secondary storage device 108 back to the primary storage device 106, if it occurred, is transparent to the originator, however, such that the originator is unaware of such movement. The request originator does not have to manually initiate, control, or management this movement process; rather the process is performed automatically by the retrieval module 112.

FIG. 4 shows example performance 400 of the method 200 of FIG. 2 in relation to the system 100 of FIG. 1, according to an embodiment of the invention. It is noted that the computer program 116, the movement module 110, the retrieval module 112, the primary storage device 106, and the secondary storage device 108 are depicted in FIG. 4. However, in the example performance 400 of FIG. 4, the retrieval module 112 does not perform any functionality.

The computer program 116 sends a request to dynamically allocate free space on the primary storage device 106 (402). The movement module 110 receives the request (404). Responsive to receiving the request, the movement module 110 determines that the actual free space on the primary storage device 106 is insufficient (406). Therefore, in responsive, the movement module 110 moves existing data from the primary storage device 106 to the secondary storage device 108 (408). In FIG. 4, the existing data as originally stored on the primary storage device 106 is indicated by the reference number 410. After the existing data has been moved to the secondary storage device 108, this data is indicated by the reference number 410' in FIG. 4.

The movement module 110 then allocates free space on the primary storage device 412 in satisfaction of the request (412), where this allocated free space is indicated by reference number 414 in FIG. 4. The movement module 110 reports back the free space to the computer program 116 (416), which receives this indication (418) in fulfillment of its request. For instance, the movement module 110 may indicate to the computer program 106 the address at which this free space is available on the primary storage device 106.

FIG. 5 shows example performance 500 of the method 300 of FIG. 3 in relation to the system 100 of FIG. 1, after the example performance 400 of the method 200 of FIG. 2 has occurred, according to an embodiment of the invention. It is noted that the computer program 116, the movement module 110, the retrieval module 112, the primary storage device 106, and the secondary storage device 108 are depicted in FIG. 5. However, in the example performance 500 of FIG. 5, the movement module 110 does not perform any functionality. In other performances of the method 300, though, the movement module 110 can perform functionality, as has been described above.

The computer program 116 sends a request to retrieve the existing data from the primary storage device 106 (502). The computer program 116 believes that the existing data is still stored on the primary storage device 106, since it is unaware that the existing data has been moved from the primary storage device 106 to the secondary storage device 108, as described above. In response to receiving the request, the retrieval module 112 determines that the existing data was previously moved to the secondary storage device 108 (506). As in FIG. 4, the existing data as stored on the secondary storage device 108 is indicated by the reference number 410' in FIG. 5.

In response to determining that the existing data has been moved to the secondary storage device 108, the retrieval module 112 moves the existing data back to the primary storage device 106 (508). The existing data as moved back to the primary storage device 106' is indicated by the reference number 410'' in FIG. 5. The retrieval module 112 then retrieves this existing data from the primary storage device 106 as has been moved back to the primary storage device 106 (510), and provides this existing data to the computer program 116 to fulfill its request (512). The computer program 116 thus receives the existing data from the primary storage device 106 (514), and remains unaware that the existing data was ever moved to the secondary storage device 108.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method that is performed by a processor for managing a primary storage device so that an amount of apparent free space on the primary storage device is effectively limitless, comprising:
receiving a request to dynamically allocate an amount of desired free space on a discrete physical primary storage device that is physically separate from a discrete physical secondary storage device to store new data on the primary storage device;
determining whether the amount of actual free space on the primary storage device is insufficient to permit allocation of the amount of desired free space on the primary storage device, by:
determining whether the amount of actual free space on the primary storage device is insufficient to permit allocation of an amount of free space on the primary storage device greater than the amount of desired free space;
in response to receiving the request, and in response to determining that the amount of actual free space on the primary storage device is insufficient to permit allocation of the amount of desired free space on the primary storage device,
moving existing data stored on the primary storage device to the secondary storage device to increase the amount of actual free space on the primary storage device, such that the existing data appears to still be stored on the primary storage device; and
allocating the amount of desired free space on the primary storage device, wherein the existing data is moved from the primary storage device to the secondary storage device responsive to receipt of the request to dynamically allocate the amount of desired free space on the primary storage device.

2. The method of claim 1, wherein the method is performed automatically such that movement of the existing data and allocation of the amount of desired free space are performed without having to be manually initiated, controlled, or managed by an originator of the request, and such that the originator of the request is unaware that the existing data has been moved to the secondary storage device.

3. The method of claim 1, further comprising, in response to determining that the amount of actual free space on the primary storage device is insufficient to permit allocation of the amount of desired free space on the primary storage device:
identifying the existing data as data stored on the primary storage device that has been accessed least recently.

4. The method of claim 1, further comprising:
updating a data structure for the primary storage device to indicate that while the existing data appears to still be stored on the primary storage device, the existing data has in fact been moved to the secondary storage device.

5. A memory storing computer-readable code executable by a computing device to perform a method for managing a primary storage device so that an amount of apparent free space of the primary storage device is effectively limitless, the method comprising:
receiving a request to dynamically allocate an amount of desired free space on a discrete physical primary storage device that is physically separate from a discrete physical secondary storage device to store new data on the primary storage device;
determining whether the amount of actual free space on the primary storage device is insufficient to permit allocation of the amount of desired free space on the primary storage device, by:
determining whether the amount of actual free space on the primary storage device is insufficient to permit allocation of an amount of free space on the primary storage device greater than the amount of desired free space;
in response to receiving the request, and in response to determining that the amount of actual free space on the primary storage device is insufficient to permit allocation of the amount of desired free space on the primary storage device,
moving existing data stored on the primary storage device to the secondary storage device to increase the amount of actual free space on the primary storage device, such that the existing data appears to still be stored on the primary storage device; and
allocating the amount of desired free space on the primary storage device, wherein the existing data is moved from the primary storage device to the secondary storage device responsive to receipt of the request to dynamically allocate the amount of desired free space on the primary storage device.

6. The memory of claim 5, wherein the method is performed automatically such that movement of the existing data is performed without having to be manually initiated, controlled, or managed by an originator of the request, and such that where the existing data has been moved to the secondary storage device the originator of the request is unaware that the existing data has been moved to the secondary storage device.

7. The memory of claim 5, wherein the method further comprises determining whether the existing data has been moved to the secondary storage device, by:
looking up the existing data within a data structure for the primary storage device to determine whether the existing data, while appearing to still be stored on the primary storage device, has in fact been moved to the secondary storage device.

8. The memory of claim 5, wherein the method further comprises, in response to determining that the existing data has been moved to the secondary storage device:
in response to determining that an amount of actual free space on the primary storage device is insufficient to permit allocation of an amount of needed free space on the primary storage device to move the existing data from the secondary storage device back to the primary storage device,
moving other existing data stored on the primary storage device to the secondary storage device to increase the amount of actual free space on the primary storage device, such that the other existing data appears to still be stored on the primary storage device.

9. The memory of claim 5, further comprising:
updating a data structure for the primary storage device to indicate that whereas before the existing data appeared to still be stored on the primary storage device but was in fact moved to the secondary storage device, the existing data has now been moved back to the primary storage device.

10. A system comprising:
a processor;
a discrete physical primary storage device having an amount of apparent free space that is effectively limitless, the primary storage device being a physical storage device;

a discrete physical secondary storage device physically separate from the secondary storage device;

a memory storing computer-executable code executable by the processor to:

receive a request to dynamically allocate an amount of desired free space on the discrete physical primary storage;

determine whether the amount of actual free space on the primary storage device is insufficient to permit allocation of the amount of desired free space on the primary storage device, by:

determining whether the amount of actual free space on the primary storage device is insufficient to permit allocation of an amount of free space on the primary storage device greater than the amount of desired free space;

in response to receiving the request, and in response to determining that the amount of actual free space on the primary storage device is insufficient to permit allocation of the amount of desired free space on the primary storage device, move existing data stored on the primary storage device to the secondary storage device to increase the amount of actual free space on the primary storage device, such that the existing data appears to still be stored on the primary storage device; and allocate the amount of desired free space on the primary storage device, wherein the existing data is moved from the primary storage device to the secondary storage device responsive to receipt of the request to dynamically allocate the amount of desired free space on the primary storage device.

11. The system of claim 10, wherein the code is executable by the processor to move the existing data to the secondary storage device automatically without having to be manually initiated, controlled, or managed by a first originator of a first request, such that the first originator is unaware that the existing data has been moved to the secondary storage device, and wherein the code is executable by the processor to move the existing data back to the primary storage device automatically without having to be manually initiated, controlled, or managed by a second originator of a second request, such that where the existing data has been moved to the secondary storage device the second originator is unaware that the existing data has been moved to the secondary storage device.

12. The system of claim 10, wherein the memory is further to store a data structure for the primary storage device, the data structure identifying for the existing data:

when the existing data was accessed most recently; and, whether the existing data is stored on the primary storage device or the secondary storage device.

13. The system of claim 12, wherein the code is executable by the processor to identify the existing data as data stored on the primary storage device that has been accessed least recently, by consulting the data structure.

14. The system of claim 12, wherein the code is executable by the processor to update the data structure to indicate that while the existing data appears to still be stored on the primary storage device, the existing data has in fact been moved to the secondary storage device.

15. The system of claim 12, wherein the code is executable by the processor to determine whether the existing data has been moved to the secondary storage device, by consulting the data structure.

16. The system of claim 12, wherein the code is executable by the processor to update the data structure to indicate that whereas before the existing data appeared to still be stored on the primary storage device but was in fact moved to the secondary storage device, the existing data has now been moved back to the primary storage device.

* * * * *